United States Patent [19]

Onozawa

[11] Patent Number: 5,213,146

[45] Date of Patent: May 25, 1993

[54] BICYCLE WHEEL LEVER

[76] Inventor: Shoji Onozawa, 19152 SE. 151st St., Issaquah, Wash. 98027

[21] Appl. No.: 874,413

[22] Filed: Apr. 27, 1992

[51] Int. Cl.$^5$ .............................. B60C 25/02
[52] U.S. Cl. .................................... 157/1.3
[58] Field of Search ............ 157/1.3; 81/DIG. 7; 7/166

[56] References Cited

U.S. PATENT DOCUMENTS

| | | | |
|---|---|---|---|
| 642,643 | 2/1900 | Swanton | 157/1.3 |
| 1,277,454 | 9/1918 | Mess | 7/166 X |
| 2,860,408 | 11/1958 | Woyton | 7/166 X |

FOREIGN PATENT DOCUMENTS

| | | | |
|---|---|---|---|
| 100576 | 4/1937 | Australia | 157/1.3 |
| 943503 | 3/1949 | France | 157/1.3 |

OTHER PUBLICATIONS

Cycle Source Catalog, REI, 1990.

Primary Examiner—D. S. Meislin
Attorney, Agent, or Firm—Graybeal Jackson Haley & Johnson

[57] ABSTRACT

A bicycle wheel lever for removing a tire from a bicycle wheel rim is disclosed. The bicycle wheel lever has an elongate rod having a first end and a second end. The first end of the elongate rod is substantially planar and has a broadened face portion and a curved lip. An arm on the second end of the elongate rod is oriented substantially perpendicular to and angled upwardly from the elongate rod. The arm has a hexagonal cross-section. The bicycle tire lever separates a bicycle tire from a wheel rim by placement of the first end of the elongate rod between a bicycle tire and a wheel rim, by pivotal movement of the elongate rod toward the wheel spoke, and by bracing any portion of the length of the arm against the wheel spoke to secure the bicycle wheel lever.

6 Claims, 2 Drawing Sheets

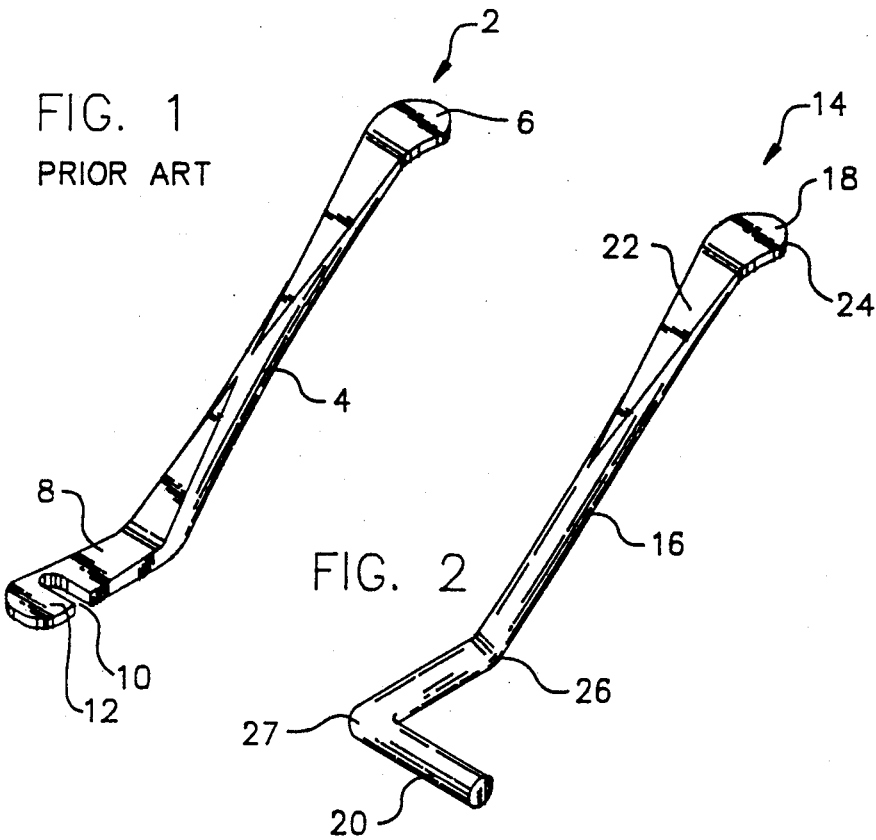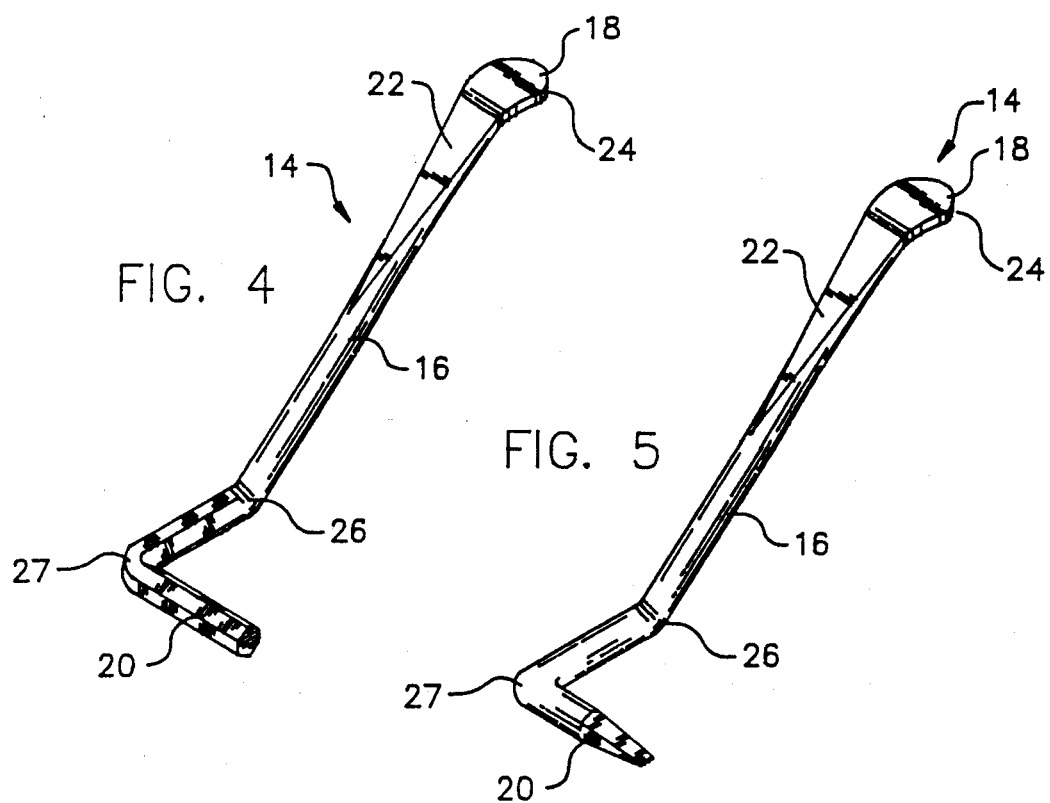

5,213,146

BICYCLE WHEEL LEVER

BACKGROUND OF THE INVENTION

Bicycle wheel levers are known in the art to remove bicycle tires from bicycle wheel rims. These prior art bicycle wheel levers generally are comprised of an elongate rod having a first flattened end and a second flattened end. The second flattened end is angled with respect to the elongate rod and has a relatively small opening therein. The opening encompasses almost the entire width of the second flattened end, and the second flattened end has a rib portion adjacent the opening.

In operation, bicycle wheel levers known in the art are employed to remove tires by placing the first flattened end of the bicycle wheel lever between the tire and the wheel rim. Next, the elongate rod of the bicycle wheel lever is pivoted toward a wheel spoke and the second flattened end is secured to a wheel spoke by placing the spoke through the opening in the second flattened end.

These conventional bicycle wheel levers suffer from the following limitations. Forcing a spoke through the relatively shallow, constraining opening of the second flattened end of the bicycle tire lever often causes bending, scoring, or breaking of the spoke. Also, the extreme forces employed often result in damage to the tire or rim. Finally, it is unduly difficult to secure a wheel spoke in the constraining opening of the second flattened end of the bicycle tire lever due to the large amount of torque and resistive forces encountered upon pivotal movement of the elongate rod, and the spoke often becomes disengaged from the shallow opening of the tire lever.

A need exists for the above type of bicycle wheel lever wherein the bicycle spoke can be braced at numerous positions on the bicycle wheel lever to ensure secure attachment therewith such that excessive torquing and forces are avoided which bend, score, or break the spoke and which make securing the bicycle wheel lever to the spoke unduly difficult.

SUMMARY OF THE INVENTION

A bicycle wheel lever for removing a tire from a bicycle wheel rim includes an elongate rod having a first end and a second end, the first end being substantially planar. An arm on the second end of the elongate rod is oriented substantially perpendicular to, and angled upwardly from, the elongate rod. The bicycle tire lever separates a bicycle tire from a wheel rim by placement of the first end of the elongate rod between the bicycle tire and the wheel rim, by pivotal movement of elongate rod toward a wheel spoke, and by bracing any portion of the length of the arm against the wheel spoke to secure the bicycle wheel lever.

Preferably, the planar first end of the elongate rod has a curved lip and a broadened face portion.

Preferably, the arm of the bicycle wheel lever has a hexagonal cross-section to function as an allen wrench. However, instead, the end of the arm of the bicycle wheel lever can be substantially planar such that it mates with the head of a screw to function as a screw driver.

BRIEF DESCRIPTION OF THE DRAWINGS

The foregoing objects and the attendant advantages of this invention will become more readily appreciated as the same becomes better understood by reference to the following detailed description when taken in conjunction with the accompanying drawings wherein:

FIG. 1 is a perspective view of a prior art bicycle wheel lever;

FIG. 2 is a perspective view of a first embodiment of the bicycle wheel lever of the present invention;

FIG. 4 is a perspective view of a second embodiment of the bicycle wheel lever of the present invention;

FIG. 5 is a perspective view of a third embodiment of the bicycle wheel lever of the present invention.

DETAILED DESCRIPTION OF THE PREFERRED EMBODIMENT

Figure 3:
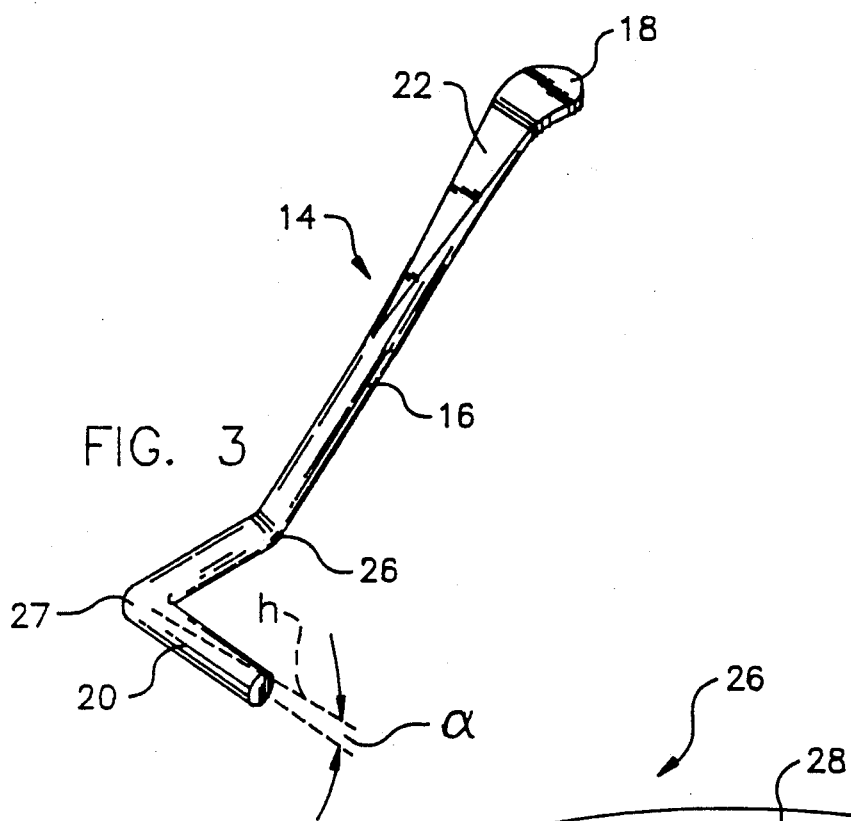
FIG. 3 is an end view of the bicycle wheel lever of the present invention.
Figure 6:
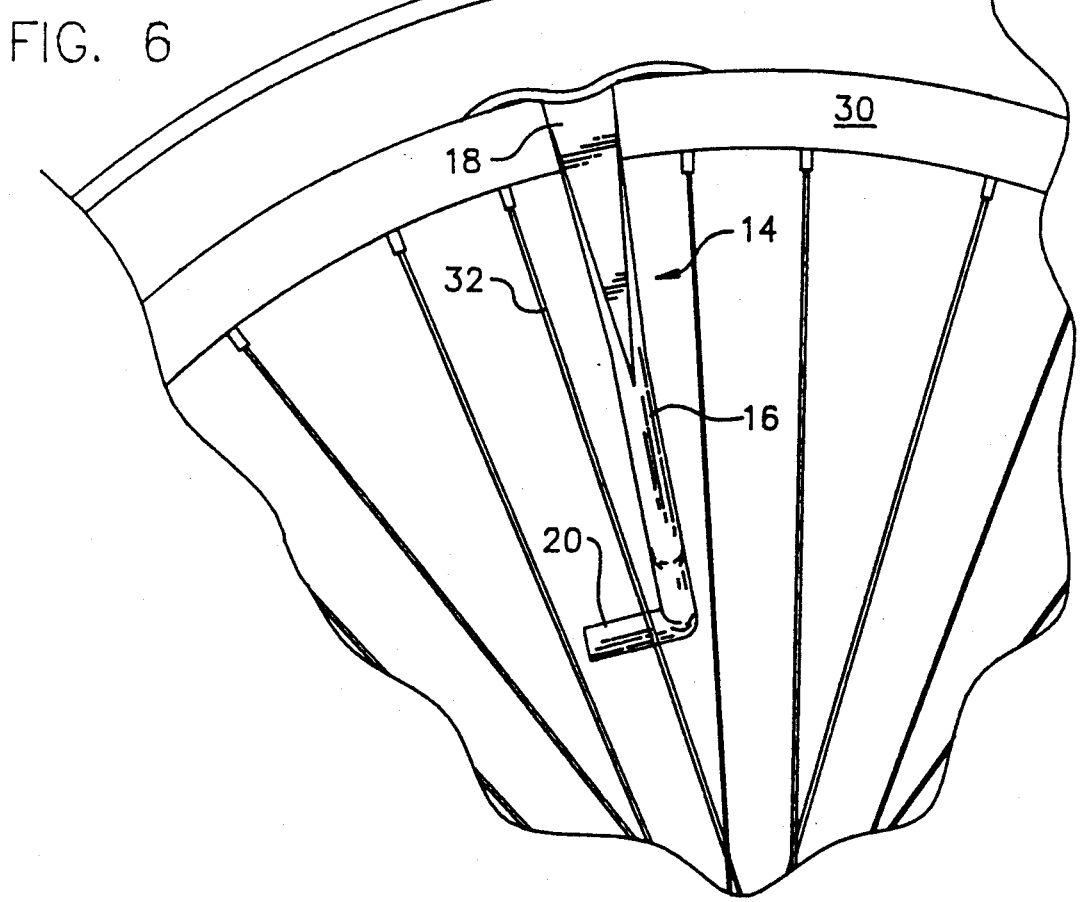
FIG. 6 is a perspective view of the bicycle wheel lever of the present invention in use on a bicycle wheel.

Referring to FIG. 1, a prior art bicycle wheel lever 2 is shown which is comprised of an elongate rod having a first flattened end 6 and a second flattened end 8 which is angled relative to elongate rod 4. Second flattened end 8 includes opening 10 which encompasses almost the entire width of second flattened end 8. Thus, rib 12 is present adjacent opening 10.

Referring to FIG. 2, the first embodiment of the present invention is shown. Bicycle wheel lever 14 includes elongate rod 16 having first end 18 and second end 20. First end 18 is preferably substantially planar and has a broadened face portion 22 with a curved lip 24 such that first end 18 can be conveniently placed between a flat bicycle tire and the wheel rim, as described below.

Second end 20 is an arm that is oriented substantially perpendicularly to the portion of elongate rod 16 to which it is attached. However, it is to be understood that second end 20 does not have to be at exactly 90° with respect to this portion of elongate rod 16 but can form an angle therewith between about 70° and 110°. The ratio of the length of the elongate rod 6 to the length of second end 20 is preferably between about 6 to 1 and 7 to 1. However, the length of elongate rod 16, the length of second end 20, and the ratio of these respective lengths can be any values which provide adequate leverage for the removal of a bicycle tire from a bicycle wheel, and which allow bracing of second end 20 against a spoke of the bicycle wheel. A bend 26 is present on elongate rod 16 adjacent second end 20 such that an angle of about 110° and about 130° is located between the portion of elongate rod 16 having second end 20 and the portion of elongate rod 16 having first end 18. As shown in FIG. 3, second end 20 is preferably oriented with respect to elongate rod 16 such that the longitudinal axis of second end 20 is disposed at an angle $\alpha$ relative to a horizontal plane passing through bend 27 of second end 20 of elongate rod 16, as shown by element notation h. Horizontal plane h is oriented parallel to the longitudinal axis of the portion of elongate rod 16 having first end 18, and is in plane with broadened face portion 22 of first end 18. Angle $\alpha$ is preferably between about 5° and about 20°.

In the first embodiment shown in FIG. 2, the cross-section of second end 20 is circular, however, the second embodiment of FIG. 3 shows second arm 20 having a hexagonal cross-section such that second arm 20 functions as an allen wrench. Additionally, in the third embodiment of the present invention of FIG. 4, second arm end 20 has a substantially planar terminus which is adapted to mate with the head of a screw such that second arm end 20 functions as a screw driver. Except for the differences described immediately above, the second embodiment of FIG. 3 and the third embodiment of FIG. 4 are identical in all other respects to the first embodiment of FIG. 2 described in detail above.

With reference to FIG. 5, operation of the subject invention is described. Bicycle wheel lever 14 of the present invention is employed to remove a bicycle tire from a wheel as follows. First end 18 of bicycle wheel lever 14 is placed on wheel 26 between tire 28 and rim 30. Elongate rod 16 is next pivotally moved toward spoke 32 of wheel 26 such that elongate rod 16 functions as a lever. In this manner, a portion of tire 28 is separated from rim 30. Bicycle wheel lever 14 is secured onto wheel 26 by bracing any portion of the length of second end 20 against spoke 32. The freedom to brace any portion of the length of second end 20 against spoke 32 thus minimizes the torque and resistive forces encountered upon securing bicycle wheel lever onto wheel 26. Therefore, scoring, bending, or breaking of spoke 32 is avoided, damage to tire 28 and/or rim 30 is prevented; and the securing of bicycle wheel 14 onto wheel 26 is more convenient. Finally, additional bicycle wheel levers 14 are secured to wheel 26 employing the above referenced steps in order to remove tire 28. Generally, two or three additional bicycle levers 14 are required for removal of tire 28.

While preferred embodiments of the invention have been illustrated and described, it will appreciated if the various changes can be made therein without departing from the spirit and scope of the invention.

I claim:

1. A bicycle wheel lever comprising:

an elongate rod having a first portion connected at an oblique angle to a second portion, a first end with a substantially planar face portion extending obliquely therefrom, and a second end, said second end having a longitudinal axis; and an arm on said second end of said elongate rod, having a longitudinal axis, and being oriented at a first angle substantially perpendicularly to said second portion of said elongate rod, the longitudinal axis of said arm being disposed at an acute angle relative to a horizontal plane which is parallel with the longitudinal axis of said second portion of said elongate rod and parallel with said first end face portion whereby said bicycle wheel lever separates a bicycle tire from a wheel rim by placement of said firs end of said elongate rod between a bicycle tire and a wheel rim, by pivotal movement of said elongate rod toward a wheel spoke, and by bracing any portion of the length of said arm against a wheel spoke to secure said bicycle wheel lever.

2. The bicycle wheel lever of claim 1 wherein said arm has a hexagonal cross-section.

3. The bicycle wheel lever of claim 1 wherein said arm has an end remote from said elongate rod, said arm end being substantially planar such that said arm is adapted to mate with a head of a screw.

4. The bicycle wheel lever of claim 1 wherein said first angle being about 70°–110°.

5. The bicycle wheel lever of claim 1 wherein said acute angle being about 5°–20°.

6. The bicycle wheel lever of claim 1 wherein said oblique angle being about 110°–130°.

* * * * *